(12) United States Patent
Kerfoot et al.

(10) Patent No.: US 6,569,224 B2
(45) Date of Patent: *May 27, 2003

(54) HYDROMETALLURGICAL PROCESS FOR THE RECOVERY OF NICKEL AND COBALT VALUES FROM A SULFIDIC FLOTATION CONCENTRATE

(75) Inventors: Derek George Eagland Kerfoot, Oakville (CA); Eberhard Krause, Campbellville (CA); Bruce John Love, Georgetown (CA); Avinash Singhal, Mississauga (CA)

(73) Assignee: Inco Limited, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/175,023

(22) Filed: Jun. 19, 2002

(65) Prior Publication Data

US 2003/0033906 A1 Feb. 20, 2003

Related U.S. Application Data

(63) Continuation of application No. 09/664,475, filed on Sep. 18, 2000, now Pat. No. 6,428,604.

(51) Int. Cl.$^7$ ................................................ C22B 15/00
(52) U.S. Cl. ............................. 75/743; 423/27; 423/28; 423/150.1
(58) Field of Search ......................... 75/743; 423/150.1, 423/27, 28

(56) References Cited

U.S. PATENT DOCUMENTS 6,428,604 B1 * 8/2002 Kerfoot et al. ............... 75/743

* cited by examiner

Primary Examiner—Roy King
Assistant Examiner—Andrew Wessman
(74) Attorney, Agent, or Firm—Edward A. Steen

(57) ABSTRACT

A hydrometallurgical process for the recovery of nickel and cobalt values from a sulfidic flotation concentrate. The process involves forming a slurry of the sulfidic flotation concentrate in an acid solution, and subjecting the slurried flotation concentrate to a chlorine leach at atmospheric pressure followed by an oxidative pressure leach. After liquid-solids separation and purification of the concentrate resulting in the removal of copper and cobalt, the nickel-containing solution is directly treated by electrowinning to recover nickel cathode therefrom.

1 Claim, 3 Drawing Sheets

HYDROMETALLURGICAL PROCESS FOR THE RECOVERY OF NICKEL AND COBALT VALUES FROM A SULFIDIC FLOTATION CONCENTRATE

CROSS REFERENCE TO RELATED APPLICATION

This application is a continuation of U.S. patent application Ser. No. 09/664,475 filed Sep. 18, 2000 now U.S. Pat. No. 6,428,604.

FIELD OF THE INVENTION

The present invention relates to a hydrometallurgical process for the separation, extraction and recovery of nickel and cobalt values from a sulfidic flotation concentrate. More specifically, the process involves an atmospheric pressure chlorine leach conducted under acidic conditions, followed by an oxidative acid pressure leach, and recovery of nickel by an electrowinning step.

BACKGROUND OF THE INVENTION

Metallurgists have long sought to develop economically viable hydrometallurgical processes for the recovery of base metals from sulfidic flotation concentrates, as an alternative to the conventional smelting and refining processes. Smelters have become increasingly costly to build and to operate as a result of more stringent environmental emission controls. Many of the processes studied over the past fifty years have utilized the leaching of an aqueous slurry of the sulfidic flotation concentrate in an air or oxygen atmosphere in a pressure autoclave, to achieve the primary separation of the metal values from the iron, sulfur and gangue components of the concentrate. Few of these processes have achieved commercial success.

A hydrometallurgical process based on the pressure leaching of nickel-copper sulfide flotation concentrates in ammoniacal ammonium sulfate solution in an atmosphere of air at 95° C., was commercialized by Sherritt Gordon Mines Limited in Canada in the early 1950s. (J. R. Boldt, Jr. and P. E. Queneau, *The Winning of Nickel*, Longmans Canada Limited, Toronto, 1967, pp 299–314), and was operated successfully for forty years. Due to its relatively high energy consumption, and the necessity for providing a market for the ammonium sulfate fertilizer by-product, this process has not been widely adopted by other nickel producers because it was particularly adapted to the general location and available feedstocks of the Sherritt Gordon plant.

A sulfuric acid based pressure leaching process for the treatment of zinc sulfide flotation concentrates has also been in successful commercial operation since 1981 and has subsequently been adopted by several zinc producers to replace the conventional roasting technology. In this process, the zinc sulfide flotation concentrate is oxidatively pressure leached in a sulfuric acid solution at 150° C., to produce a solution of zinc sulfate, and a residue consisting of elemental sulfur and iron oxide. The zinc sulfate solution is purified to remove trace impurity metals, and zinc metal is recovered from the purified leach solution by the long-established electrowinning process. Typically less than 10% of the sulfide in the concentrate is oxidized to sulfate in the pressure leach, with the balance being recovered as elemental sulfur in solid form, for sale or storage. The deportment of the sulfur in this process gives it a major advantage over the older roasting process, in which the sulfur is all converted to sulfuric acid, which must frequently be marketed at a loss, or converted to a solid waste such as gypsum for landfill disposal.

There have been numerous attempts to extend this oxidative acid pressure leaching technology to the direct treatment of copper and nickel-copper sulfide flotation concentrates, but no such process has as yet been successfully commercialized. A major obstacle to the application of oxidative pressure leaching at temperatures above the melting point of sulfur, to the treatment of chalcopyrite-containing flotation concentrates, has been the tendency of molten sulfur to coat the surface of the metal sulfide particles. This inhibits and prevents the reaction of the metal sulfide with the acid solution. Consequently, the oxidative pressure leaching of copper concentrates in sulfuric acid at temperatures above 120° C. typically results in slow reaction rates and low metal extractions. Zinc and nickel sulfide particles have a weaker affinity for molten sulfur than do copper sulfides, and the successful zinc oxidative pressure leach process described above utilizes organic additives, such as lignosulfonate salts or quebracho, to prevent the coating of the sulfide particles during the leaching process. These additives are ineffective for copper sulfide concentrates, but recently, (see U.S. Pat. No. 5,730,776 to Collins et al.), the addition of low grade coals has been found to prevent the coating of both zinc and copper sulfides in oxidative pressure leaching in sulfuric acid solution at 150° C.

A different approach to overcoming the problem of the occlusion of the sulfide particle surfaces by molten sulfur is described in U.S. Pat. No. 4,039,406 to Stanley et al. This patent discloses the addition of low concentrations of chloride ion to the leach solution in the oxidative pressure leaching of a chalcopyrite concentrate in sulfuric acid solution at temperatures above 120° C. The benefits of the chloride addition were shown to be greatly increased rates of leaching of chalcopyrite and a major reduction in the amount of sulfide oxidized to sulfate, and as a result, the recovery of virtually all the iron content of the concentrate as hematite in the solid residue. In the absence of the chloride ion addition, oxidative pressure leaching of chalcopyrite in sulfuric acid at 150° C. typically produces a leach solution containing high levels of acid and dissolved iron. With the chloride addition, the leach solution typically has a pH value of 2.5 to 3, and the iron concentration is less than 1 g/L. A further consequence of the low degree of sulfur oxidation, and the resulting low level of acidity in the chloride containing leach solution, is that a large portion of the leached copper can be reprecipitated as basic copper sulfate. The extent of this effect can be varied by adjusting the amount of acid added to the leach. This ability to control the deportment of the copper between solution and leach residue provides considerable flexibility in the design of the copper recovery process.

The applicability of oxidative pressure leaching with a chloride ion addition to a sulfate solution in the pressure leaching of nickel-containing sulfide flotation concentrates was subsequently described in a paper entitled "Oxygen Pressure Leaching of Fe—Ni—Cu Sulfide Concentrates at 110° C.—Effect of Low Chloride Addition" Subramanian et al. (*Hydrometallurgy* 2, (1976), pp. 117–125).

More recently, D. L. Jones in U.S. Pat. Nos. 5,431,788; 5,645,708; 5,650,057; 5,855,858; 5,874,055; and 5,902,474 discloses the combination of the chloride-assisted sulfuric acid oxidative pressure leaching of copper sulfide concentrates with the recovery of copper by a variety of process flowsheets based on conventional solvent extraction and electrowinning.

U.S. Pat. No. 5,650,057 issued to (Jones, describes a hydrometallurgical process for the extraction of copper from an ore or concentrate. The process broadly comprises subjecting the ore or concentrate to an oxidative pressure leach in an acidic solution containing halogen ions and a source of bisulfate or sulfate ions. The process extends to the extraction of non-cuprous metals such as zinc, nickel and cobalt. Significantly, during the oxidative pressure leach the metal may be precipitated as an insoluble basic salt, such as basic copper sulfate, or substantially completely solubilized and precipitated later as the basic copper salt. The specific application of this process to nickel-cobalt containing sulfide concentrates is described in greater detail in U.S. Pat. No. 5,855,858, also issued to Jones.

Of interest to the present invention is the process illustrated in FIG. 1 of U.S. Pat. No. 5,855,858. The process involves subjecting a copper-nickel flotation concentrate to an oxidative pressure leach. Following separation of the leach solution and leach residue, the leach solution is passed to a copper solvent extraction circuit. The raffinate from the copper extraction step is then passed to a conventional nickel hydroxide precipitation step using lime. Following liquid/solid separation, the residue containing substantially the total nickel and cobalt values is subjected to an ammoniacal leach and the leach solution therefrom first passed to a solvent extraction circuit to remove cobalt. The raffinate from the cobalt extraction step is finally passed to nickel solvent extraction and electrowinning to thereby produce nickel cathode.

It is to be noted that in processes for the recovery of nickel from ores or concentrates, which include a chloride-assisted oxidative pressure leach in the process, heretofore it has been necessary that the copper-free nickel-containing leach stream undergo a solvent extraction processing step in order to produce a purified high strength nickel sulfate solution, suitable for recovery of the nickel values by electrowinning therefrom.

The benefits of finely grinding a base metal sulfide flotation concentrate prior to oxidative pressure leaching were first identified in the 1970s by Gerlach et al., ("Activation and Leaching of Chalcopyrite Concentrates in Dilute Sulfuric Acid", *International Symposium on Hydrometallurgy*, 1973, pp. 401–416), and Pawlek ('The Influence of Grain Size and Mineralogical Composition on the Leachability of Copper Concentrates', *International Symposium on Copper Extraction and Refining*, 1976, pp. 690–705). At that time, the fine grinding of flotation concentrates to particle sizes below about 30 microns was considered to be uneconomical due to high energy consumption with existing milling technology. Significant advances in fine grinding technology have occurred over the past thirty years, and a variety of grinding mills are now commercially available to reduce the particle size of base metal flotation concentrates to less than 20 microns, without excessive consumption of energy. A number of hydrometallurgical processes have recently been proposed, which rely on fine grinding prior to the metal dissolution step in order to achieve high metal extraction under significantly milder leaching conditions, than are required for conventionally sized flotation concentrates. Examples of this type of process are described in U.S. Pat. Nos. 5,232,491 to Corrans et al., and 5,917,116 issued to Johnson et al. The U.S. '491 patent teaches a method of activating a mineral species by fine or ultra fine milling thereof prior to processing by methods of oxidative hydrometallurgy. The U.S. '116 patent teaches a method of processing a copper mineral by initially milling the mineral to a particle size of between 2 to 20 microns. The mineral is then oxidatively pressure leached in the presence of chloride ions at a temperature below the melting point of elemental sulfur.

Deleteriously, despite the advantages of the oxidative pressure leaching process using mixed chloride-sulfate solutions, the process flowsheets proposed by Jones in his series of the above-referenced U.S. patents for the treatment of nickel-containing ores or concentrates are relatively complex with numerous inefficient separation steps. They have yet to find commercial acceptance. Thus, there exists the need for a sulfidic nickel flotation concentrate treatment process which combines the advantages of an oxidative pressure leach in mixed chloride-sulfate solutions, with simpler and more direct solution purification and metal recovery processes.

SUMMARY OF THE INVENTION

It is a primary objective of the present invention to provide a novel hydrometallurgical process for the recovery of nickel and cobalt values from a sulfidic flotation concentrate, which process includes an atmospheric acid chlorine leach followed by an oxidative pressure leach, and wherein the purified nickel leach solution obtained therefrom may be directly passed to an electrowinning circuit to thereby produce nickel cathode. Furthermore, it is an important requirement that the dissolution of the metal values occurs rapidly and that a high recovery of sulfur as elemental sulfur be attained.

It is a secondary objective of the invention to provide, from the atmospheric acid chlorine leach, a chloride-containing feed solution suitable for use in the oxidative pressure leach whereby the primary objective described above may be attained.

It is yet a further objective of the invention to utilize the chlorine produced in the nickel electrowinning step as an oxidant in the leaching of the sulfidic flotation concentrate.

Furthermore, it is an objective of the invention to provide a process with the minimum number of process steps, and with minimum reagent costs.

Finally, as with all potential commercially viable hydrometallurgical processes, one seeks always to obtain maximum recovery of metal values, with minimum capital and operating cost.

In accordance with the present invention there is provided a process for the extraction, separation and recovery of nickel, cobalt, and copper from a nickel-cobalt-copper-sulfide containing flotation concentrate. The process comprises the steps of preparing a slurry containing the sulfidic flotation concentrate and contacting said slurry with an oxygen and chlorine-containing gaseous stream in an atmospheric acidic leach stage to thereby generate a pressure leach feed slurry containing a predetermined concentration of chloride ions therein. The pressure leach feed slurry is then subjected to an oxidative pressure leach under acidic conditions at elevated temperature to selectively leach the majority of the nickel, cobalt and copper therefrom to form a nickel, cobalt, copper-containing leach solution and a leach residue. The nickel-cobalt-copper-containing leach solution after separation of the leach residue therefrom, is treated to separately recover the copper and cobalt, and to remove impurities to thereby form a purified nickel leach solution. The nickel is then electrowon from said purified nickel leach solution to thereby produce nickel cathode and oxygen, chlorine and sulfuiric acid therefrom. Preferably the sulfidic flotation concentrate is finely ground prior to the atmospheric acid chloride leach and most preferably to a particulate size ranging between about 10 to 30 microns. The preferred chloride concentration of the pressure leach feed solution would range between about 2 to 40 g/L.

In a preferred embodiment of the invention, there is broadly provided a process for the extraction, separation and recovery of nickel, cobalt and copper values from a nickel-cobalt-copper sulfide-containing flotation concentrate which comprises preparing a slurry containing flotation concentrate and contacting said slurry with an oxygen and chlorine-containing gaseous stream in an atmospheric acidic leach to thereby generate a pressure leach feed slurry containing a predetermined concentration of chloride ions therein. The pressure leach feed slurry is subjected to an oxidative pressure leach under acidic conditions at elevated temperature to selectively leach the majority of the nickel, cobalt and copper therefrom to form a nickel-cobalt-copper-containing leach solution and a leach residue. The nickel-cobalt-copper-containing leach solution is subsequently separated from said leach residue. The contained copper is removed from said nickel and cobalt-containing leach solution, and the copper-depleted nickel and cobalt-containing leach solution is neutralized and iron is removed therefrom. The nickel and cobalt containing leach solution is subjected to a purification step to thereby remove impurities, typically calcium, zinc and lead, from the nickel-cobalt containing leach solution. Cobalt is removed from said nickel, cobalt-containing leach solution utilizing solvent extraction and the nickel is extracted by electrowinning from said purified nickel-containing solution. Again, the preferred particulate size of the finely ground sulfidic flotation concentrate would be as described hereabove, as would the concentration of chloride ions in the pressure leach feed solution.

The invention further extends to a process for the preparation of a pressure leach feed slurry from a nickel-cobalt-copper sulfide-containing flotation concentrate comprising the steps of finely grinding said flotation concentrate to a preselected particulate size; preparing a slurry containing said finely ground flotation concentrate in an acidic solution and contacting said slurry with an oxygen and chlorine-containing gaseous stream to thereby generate a pressure leach feed slurry containing a predetermined concentration of chloride ions therein.

Additionally, the invention contemplates recycling the formed combined oxygen/chlorine stream generated in the nickel electrowinning step to the atmospheric acid chlorine leach. Also, it is particularly advantageous to recycle the sulfuric acid-containing nickel anolyte stream to the atmospheric acid chlorine leach step.

Beneficially, by first subjecting the sulfidic flotation concentrate to an atmospheric acid chlorine leach, prior to the oxidative pressure leach, the rate of oxidation of the sulfide minerals is increased, thereby significantly reducing the size and cost of the autoclaves required for the oxidative pressure leach process.

Advantageously, as a result of practicing the process of the instant invention it is possible to directly electrowin nickel from the purified chloride-containing high strength nickel sulfate leach solution derived from the oxidative pressure leach, to thereby produce nickel with the consequent elimination of the need for nickel upgrading and purification steps involving intermediate precipitation, redissolution and solvent extraction. Furthermore, as a result of practicing the electrowinning of nickel from a chloride-containing nickel sulfate solution, in combination with the recycle of the gas stream produced at the anode, to the atmospheric leach, the chlorine is recovered in the desired form of dissolved chloride ion, thereby eliminating the necessity of reacting the recovered gas stream with hydrogen to regenerate hydrochloric acid.

It is an essential requirement of the process of the invention that an atmospheric acid chlorine leach be conducted on the sulfidic flotation concentrate prior to the oxidative pressure leach.

The recovery of nickel is improved and the reaction time in the oxidative pressure leach is markedly reduced in a relatively uncomplicated, commercially viable process involving fewer process steps than those taught by the prior art.

Without being bound by same, it is believed that the novel incorporation of an atmospheric acid leach step, in the presence of chlorine as the oxidant, prior to the conduction of the oxidative pressure leach, is instrumental in the achievement of the objectives described above.

As an additional advantage, the provision of a fine grinding step of the sulfidic flotation concentrate prior to the atmospheric acid chlorine leach step assists in increased metals recovery.

PREFERRED EMBODIMENT OF THE INVENTION

Figure 1:
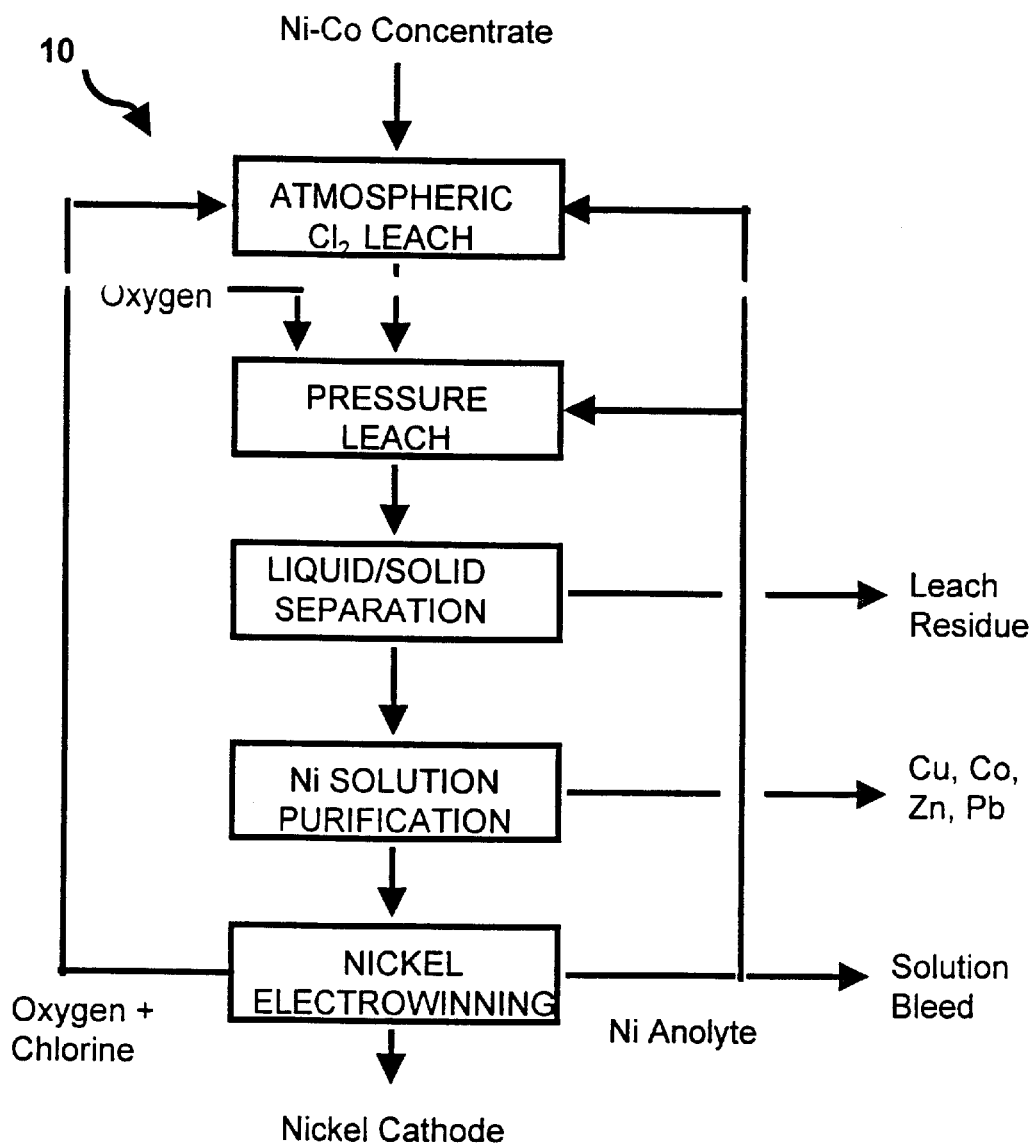
FIG. 1 is a generalized schematic flowsheet of the present invention.
Figure 2:
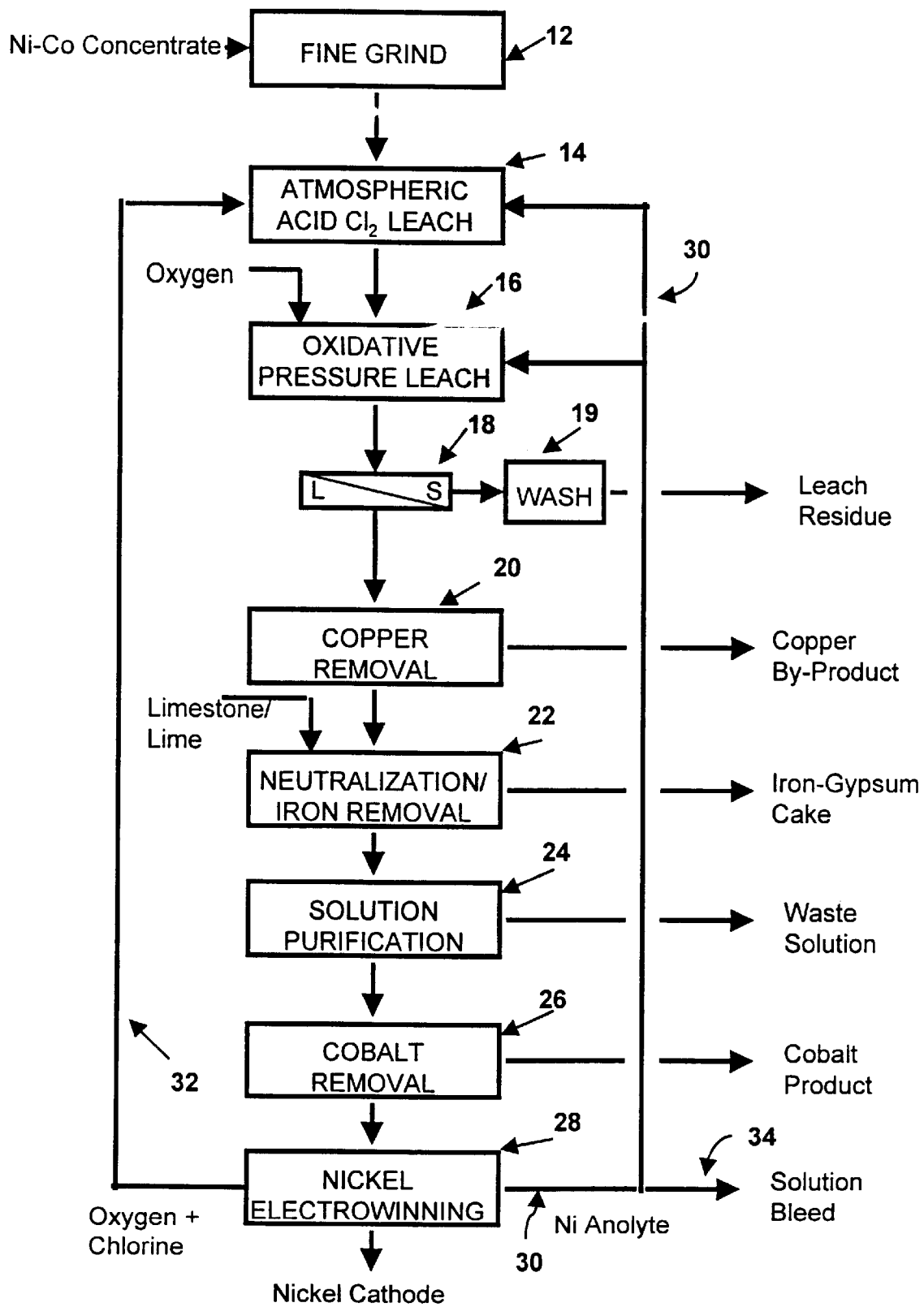
FIG. 2 is a schematic of the flowsheet of an embodiment of the process of FIG. 1.

There is depicted in FIG. 1, by the numeral 10, the flowsheet of the present process and in FIG. 2 on embodiment of the process. Turning to FIG. 2, the process comprises fine grinding, at step 12, of the nickel-copper-cobalt-containing sulfidic flotation concentrate, followed by an atmospheric acid chlorine leach 14. The slurry of atmospheric acid chlorine leach residue in acidic chloride-containing solution, hereinafter referred to as the pressure leach feed slurry, is passed to oxidative pressure leach step 16. Following a liquid/solid separation step 18, the nickel-cobalt-copper containing oxidative pressure leach solution is passed to a copper removal step 20. Following copper removal, the nickel-cobalt containing leach solution is subjected to a combined neutralization and iron removal step 22 followed by a solution purification step 24. After removal of cobalt from the solution at step 26, the nickel is electrowon from said purified nickel sulfate-chloride leach solution at nickel electrowinning step 28 to produce nickel cathode with the formation of sulfuric acid and the evolution of oxygen and chlorine gases. An aqueous slurry of a nickel-cobalt-copper sulfidic flotation concentrate, typically containing 5 to 25% Ni, 1 to 10% Cu and 0.2 to 1.0% Co, with a particle size corresponding to a $d_{80}$ of 40 to 80 microns, is fed to an attritor mill in fine grinding step 12 to reduce the particle size to a $d_{80}$ in the range 10 to 30 microns. The slurry of finely ground sulfidic flotation concentrate is mixed with nickel anolyte solution 30, recycled from nickel electrowinning step 28, which typically contains 45 to 55 g/L Ni and 10 to 50 g/L $H_2SO_4$ and leached in atmospheric acid chlorine leach step 14, where it is sparged with a mixture of chlorine and oxygen, also recycled from the nickel electrowinning step 28. The leaching is carried out in a train of two or more agitated reaction tanks arranged in series, at a temperature of about 40 to 90° C., with a retention time of at least 30 minutes. The chlorine, oxygen and acid react with the nickel-containing minerals, pyrrhotite and pentlandite, according to the following equations:

$$FeS+Cl_2 \rightarrow FeCl_2+S° \quad (1)$$

$$2FeS+O_2+2H_2SO_4 \rightarrow 2FeSO_4+2\ H_2O+2S° \quad (2)$$

$$NiFeS_2+2Cl_2 \rightarrow NiCl_2+FeCl_2+2S° \quad (3)$$

$$NiFeS_2+O_2+2H_2SO_4 \rightarrow NiSO_4+FeSO_4+2\ H_2O+2S° \quad (4)$$

$$S°+1.5O_2+H_2O \rightarrow H_2SO_4 \quad (5)$$

Typically, following the atmospheric acid chlorine leach 14, the chloride concentration in said leach solution ranges between about 2 to 40 g/L and most preferably ranges between about 2 to 20 g/L.

The term "about" before a series of values, unless otherwise indicated, will be interpreted as applying to each value in the series.

The reaction between chlorine and the sulfide minerals is rapid and complete, so that essentially all of the chlorine produced at the anode in the nickel electrowinning step 28 is recovered and converted to chloride in the atmospheric acid chlorine leach product solution, i.e. the pressure leach feed slurry. The vent gas from the atmospheric leach tanks is therefore chlorine-free. The reaction of oxygen and sulfuric acid with the sulfide minerals is slower and the utilization of oxygen is relatively low under the atmospheric acid leach conditions, so that it may be advantageous to provide additional air or oxygen to maximize the reaction of sulfuric acid with the sulfide minerals. Both the chlorine and the acid are observed to attack pyrrhotite selectively over pentlandite, so that the percentage iron extraction is typically higher than the extraction of nickel. Generally, up to 15% of the iron content and 5 to 10% of the nickel content of the concentrate are dissolved in the atmospheric acid chlorine leach. The major soluble product of the atmospheric acid chlorine leach is thus ferrous chloride, with a lesser amount of nickel chloride. However more importantly, 15 to 20% of the sulfide content of the sulfidic flotation concentrate reacts in the atmospheric acid chlorine leach to form either elemental sulfur or sulfate.

Two significant benefits in the operation of the oxidative pressure leach are achieved by first treating the nickel-cobalt-copper sulfidic flotation concentrate in the atmospheric acid chlorine leach. Surprisingly, it has been found that the rate of oxidation of the sulfide minerals in the oxidative pressure leach is faster if the sulfidic flotation concentrate has first been treated in the atmospheric acid chlorine leach step. This beneficial result is believed to arise from the fact that a significant portion of the iron content of the sulfidic flotation concentrate is dissolved in the atmospheric acid chlorine leach, thus providing an increased concentration of dissolved iron in the oxidative pressure leach solution. It is well known that dissolved iron facilitates the transfer of oxygen in the oxidative pressure leaching of sulfide minerals. Typically, the time required for 98% nickel extraction in the oxidative pressure leach is reduced by about 33%, e.g. from 30 minutes to 20 minutes, with a corresponding substantial increase in autoclave production capacity.

Since up to about 20% of the highly exothermic sulfide oxidation reactions occur in the atmospheric acid leach before the slurry is introduced into the oxidative pressure leach autoclave, the amount of heat which must be removed from the autoclave is significantly reduced. In industrial practice the production capacity of an oxidative pressure leaching autoclave is very largely determined by the rate at which the exothermic heat of reaction can be removed. Consequently, by carrying out a significant part of the oxidation reactions in the atmospheric acid chlorine leach. The production capacity of the autoclave is significantly increased.

The atmospheric acid chlorine leach product slurry, i.e. the pressure leach feed slurry, is pumped directly as feed to the oxidative pressure leach autoclave step 16, where it is treated at a pre-selected overall acid:concentrate ratio, typically 150 to 250 kg $H_2SO_4$ per tonne of sulfidic flotation concentrate, at a temperature of 100 to 150° C. under an oxygen partial pressure of 0.5 to 1.0 MPa. The required retention time to achieve 98% nickel and cobalt extractions typically ranges from about 20 to 30 minutes at 150° C. to about 1.5 to 3 hours at 105° C. The major chemical reactions occurring in the oxidative pressure leach step can be represented by the following equations:

$$2FeS+O_2+2H_2SO_4 \rightarrow 2FeSO_4+2\ H_2O+2S° \quad (6)$$

$$NiFeS_2+O_2+2\ H_2SO_4 \rightarrow NiSO_4+FeSO_4+2\ H_2O+2S° \quad (7)$$

$$CuFeS_2+O_2+2\ H_2SO_4 \rightarrow CuSO_4+FeSO_4+2\ H_2O+2S° \quad (8)$$

$$2FeSO_4+0.5O_2+H_2SO_4 \rightarrow Fe_2(SO_4)_3+H_2O \quad (9)$$

$$Fe_2(SO_4)_3+3\ H_2O \rightarrow Fe_2O_3+3H_2SO_4 \quad (10)$$

$$S°+1.5\ O_2+H_2O \rightarrow H_2SO_4 \quad (11)$$

The precise role of the chloride ion in this system is not understood, but it is well established that the presence of the chloride at concentrations above about 2 g/L, significantly increases the rate of base metal dissolution and oxidation of sulfide to elemental sulfur. At the same time the chloride ion inhibits the oxidation of sulfide and/or elemental sulfur to sulfate. Therefore the amount of oxygen consumed during the oxidative pressure leach is significantly reduced, as is the cost of subsequently treating the oxidative pressure leach solution, by minimizing neutralization and iron removal requirements. Usually, no more than 10% of the sulfide content of the sulfidic flotation concentrate reports to the oxidative pressure leach solution as dissolved sulfate, with the balance remaining predominantly as solid elemental sulfur in the leach residue.

The concentration of nickel in the oxidative pressure leach discharge solution is generally maintained in the range of 70 to 80 g/L by adjusting the ratio of solids to total solution flow through the autoclave. The oxidative pressure leach product solution typically contains 2 to 10 g/L Cu and 0.5 to 3 g/L Co with a pH value of 1.8 to 3.0. The dissolved iron level in the pressure leach discharge solution depends upon the pH, ranging from less than 0.1 g/L at pH 2.5, to ~5 g/L at pH 1.8. The terminal pH is dependent upon the amount of sulfuric acid in the anolyte streams 30 added to leach steps 14 and 16 and on the degree of oxidation of sulfide to sulfate. The oxidative pressure leach solution also contains trace amounts of other metal impurities such as zinc and lead and may be saturated with calcium sulfate. The oxidative pressure leach residue consists predominantly of elemental sulfur (20 to 25%) and hematite (40 to 45% Fe), along with insoluble gangue materials from the sulfidic flotation concentrate.

The autoclave discharge slurry passes to a solid-liquid separation step 18 where the metal-depleted solid residue is separated from the high strength nickel-containing solution. Since the oxidative pressure leach solution contains a high concentration of nickel, it is essential that the residue should be well washed to ensure that all the entrained oxidative pressure leach solution is separated from the discard solids. The oxidative pressure residue wash step 19 may consist of either a countercurrent decantation circuit using thickeners or be carried out using countercurrent washing on belt filters. After washing, the barren oxidative pressure leach residue is discarded to a suitable impoundment system. Optionally, the elemental sulfur can be separated from the hematite and gangue components of the oxidative pressure leach residue by conventional froth flotation and filtration of molten sulfur. If economically warranted, the oxidative pressure leach residue may be processed further to recover precious and platinum group metal values.

The oxidative pressure leach solution, normally containing less than 5 g/L Cu at pH 2.0 to 3.0, is treated in copper removal step 20, where the copper is removed either by precipitation as a copper sulfide intermediate product, using a sulfide reagent or by conventional solvent extraction and electrowinning to produce a copper cathode product. Both processes generate sulfuric acid and so reduce the pH of the nickel and cobalt-containing solution, e.g.:

$$CuSO_4 + H_2S \rightarrow CuS + H_2SO_4 \quad (12)$$

Following copper removal step 20, the copper-depleted nickel and cobalt sulfate-chloride solution, which typically contains about 10 g/L of free sulfuric acid and about 1 g/l Fe, is next neutralized under oxidizing conditions to raise the pH to the range 3.5 to 4.0 to precipitate iron by hydrolysis in neutralization and iron removal step 22. This process step 22 is normally carried out at a temperature of 60 to 80° C., in a train of agitated tanks arranged in series. Finely divided limestone and slaked lime are the preferred neutralizing agents, and the slurry is sparged with air or oxygen to oxidize the dissolved ferrous iron to the ferric form, which hydrolyses to precipitate ferric hydroxide and gypsum:

$$2FeSO_4 + 0.5O_2 + H_2SO_4 \rightarrow Fe_2(SO_4)_3 + H_2O \quad (13)$$

$$Fe_2(SO_4)_3 + 6H_2O \rightarrow 2Fe(OH)_3 + 3 H_2SO_4 \quad (14)$$

$$H_2SO_4 + Ca(OH)_2 \rightarrow CaSO_4 \cdot 2H_2O \quad (15)$$

The precipitated gypsum and ferric hydroxide are separated from the iron-free nickel sulfate-chloride solution by filtration (not shown) and the solids are thoroughly washed with water to recover entrained nickel-containing solution before being discarded to an impoundment system.

Following the neutralization and iron removal step 22, the partly purified high strength nickel-cobalt solution still contains impurities such as zinc and lead, as well as residual traces of copper and iron and is saturated with calcium sulfate. The base metal impurities must be removed prior to recovering the cobalt and nickel from solution as pure products and it is also desirable to remove at least a portion of the calcium before further processing since calcium sulfate can cause a variety of problems in subsequent process steps. The base metals can be removed using conventional precipitation with a soluble sulfide, such as sodium hydrosulfide, while both the base metals and calcium can be removed using an organic phosphoric acid solvent extractant reagent such as di-2-ethylhexyl phosphoric acid (D2EHPA) in solution purification step 24. Both purification processes generate free sulfuric acid in the purified nickel-cobalt solution, which must be neutralized during processing. The preferred neutralizing agents in this step 24, are sodium hydroxide, sodium carbonate or ammonium hydroxide, since calcium reagents should be avoided at this point. The D2EHPA solvent extraction step, which operates at 55° C. at pH 3.5 to 4.0, may be carried out using either conventional mixer-settlers or countercurrent extraction columns. The calcium level in the nickel and cobalt-containing solution is reduced from over 500 mg/L to less than 100 mg/L, and zinc and iron are removed quantitatively. The levels of copper and lead are also significantly reduced. The metal-loaded loaded organic solution is stripped by contact with an acidic aqueous chloride containing-solution such as hydrochloric acid, and the calcium chloride-containing strip solution is further processed to separate and remove the contained metal values.

The purified nickel and cobalt-containing solution advances to the cobalt removal step 26, where over 99% of the cobalt is selectively removed from the nickel and cobalt-containing solution by solvent extraction, for example using Cyanex® 272, an organic phosphinic acid extractant, manufactured by Cytec Canada. Cobalt is loaded on to the organic extractant at about pH 4 and, after conventional scrubbing of the loaded organic solution to remove any entrained and/or co-extracted nickel, the cobalt is re-extracted from the organic solution by contact with an acidic aqueous strip solution. This step is preferably carried out at 50 to 55° C. The high strength cobalt strip solution is further processed to recover cobalt in the desired product form, e.g. metal cathode, cobalt oxide, cobalt carbonate or a cobalt salt. The nickel-containing raffinate solution from the cobalt removal step 26, is treated conventionally to remove any entrained organic solution, before advancing to nickel electrowinning step 28. This solution typically contains about 80 g/L Ni and has a pH value of about 4.0. In the nickel electrowinning step 28, the purified nickel sulfate-chloride solution from step 26 is electrolyzed to deposit metallic nickel on the cathodes and to produce chlorine, oxygen and sulfuric acid at the anodes.

$$NiCl_2 \rightarrow Ni° + Cl_2 \quad (16)$$

$$NiSO_4 + H_2O \rightarrow Ni° + H_2SO_4 + 0.5 O_2 \quad (17)$$

The purified high strength nickel sulfate-chloride solution is fed to conventional electrowinning cells containing a plurality of insoluble anodes interspersed with a plurality of cathodes which may be either nickel starter sheets or permanent cathode substrates fabricated from titanium or stainless steel. Nickel can be produced as full-plate cathode by plating on to nickel starter sheets, or as discrete pieces, such as ROUNDS™, by plating on to partially masked stainless steel substrates. (ROUNDS is a trademark of Inco Limited). The insoluble anodes consist of metallic titanium substrates, either mesh or full plate, coated with one or more overlayers of a transition metal oxide, preferably selected from tantalum, ruthenium and iridium oxides. Each anode is enclosed in a sheath or bag made from a semi-permeable membrane, with a hood means for removal of oxygen and chlorine gas and anolyte solution, as described in U.S. Pat. No. 4,201,653 to O'Neill et al., and U.S. Pat. No. 4,288,305 to Garritsen et al., both assigned to Inco Limited.

The nickel electrowinning process step 28 is operated at a current density of 200 to 350 amp/m² at 55 to 60° C. It is to be noted that the chloride concentration of the nickel electrowinning circuit feed solution remains inherently in the range of between about 2 to 20 g/L. The purified nickel sulfate-chloride solution, typically containing 70 to 80 g/L Ni, is added to the cathode compartment where metallic nickel is plated on to the cathode and hydrogen ions are formed. The nickel-depleted acidic solution permeates through the membrane enclosing the anode compartment, to the surface of the anode where chlorine and oxygen are formed. The nickel anolyte stream 30, recovered from the anode compartment along with chlorine and oxygen gases, generally contains 50 g/L Ni, less than 1 g/L Cl, and 20 to 50 g/L $H_2SO_4$.

The chlorine and oxygen gaseous stream 32 is recycled to atmospheric acid chlorine leach step 14 together with a portion of the anolyte solution 30. A further portion of the anolyte solution 30 is recycled to oxidative pressure leach step 16. The balance of the anolyte solution 30 as well as the wash liquors, are removed from the circuit to provide a solution bleed 34 in order to maintain the requisite water and sulfate balance in the process. The bleed solution 34 is treated with limestone and lime to neutralize the acid and precipitate the contained nickel as nickel hydroxide which is returned to the circuit (not shown). The process of the invention will now be described having reference to the following non-limitative examples.

EXAMPLE I

This example illustrates the benefits of atmospheric acid leaching of a Ni—Cu—Co sulfide-containing flotation concentrate in sulfuric acid solution using gaseous mixtures of chlorine and oxygen as oxidants, prior to an oxidative pressure leach. Atmospheric leach tests were carried out on a sample of reground ($d_{80}$~24 μm) Ni—Cu—Co sulfide flotation concentrate analyzing 10.5% Ni, 2.5% Cu, 44% Fe and 33% S. The batch atmospheric leach tests were conducted at ambient temperature on a 55% solids slurry of the sulfidic flotation concentrate in an aqueous acid solution containing varying concentrations of sulfuric acid. In each test the slurry of sulfidic flotation concentrate was sparged with a gas stream consisting of chlorine or oxygen or a mixture thereof in the amounts indicated in Table I.

TABLE I

| Test | Addition Rate, kg/t concentrate | | | % Fe Dissolution | % $S^{2-}$ oxidation | |
|------|---|---|---|---|---|---|
| | Chlorine | Oxygen | Acid | | To $S^{0*}$ | To $SO_4^{2-}$ |
| 1 | 30 | 31 | 0 | 4.1 | 16.2 | 3.1 |
| 2 | 20 | 21 | 0 | 4.9 | 9.7 | <1 |
| 3 | 20 | 0 | 74 | 9.1 | 11.1 | <1 |
| 4 | 20 | 21 | 110 | 14.3 | 12.0 | 3.4 |
| 5 | 21 | 21 | 148 | 14.3 | 11.1 | 3.1 |

These test data illustrate the effect of increasing acid addition on the extent of iron dissolution, and the relative degrees of sulfide oxidation to elemental sulfur, and to sulfate, which occur in an atmospheric acid leach, in which the slurry is sparged with chlorine and oxygen.

The atmospheric acid leach slurries produced in tests 4 and 5 were subsequently diluted with water and/or dilute sulfuric acid solution, to adjust the chloride ion content of the solution to 5 g/L, and to adjust the overall acid addition in both stages of leaching to 160 kg $H_2SO_4$/t of concentrate. A small quantity of water-soluble lignosulfonate salt was added to each of the oxidative pressure leach (OPL) feed slurries to ensure good molten sulfur dispersion. Each slurry was then oxidatively pressure leached in a batch autoclave at 150° C. under an oxygen partial pressure of 700 kPa for 30 minutes. In both OPL tests the extraction of nickel exceeded 98% after 30 minutes. For comparison, a sample of the same reground Ni—Cu—Co sulfide-containing flotation concentrate was directly oxidatively pressure leached under the same conditions, i.e. without a prior atmospheric acid chlorine leach. The extraction of nickel in this OPL test was 97% after 30 minutes. In all three tests the amount of sulfide oxidized to elemental sulfur ($S^0$) was over 75%, and the amount of sulfide oxidized to sulfate was about 15%.

Figure 3:
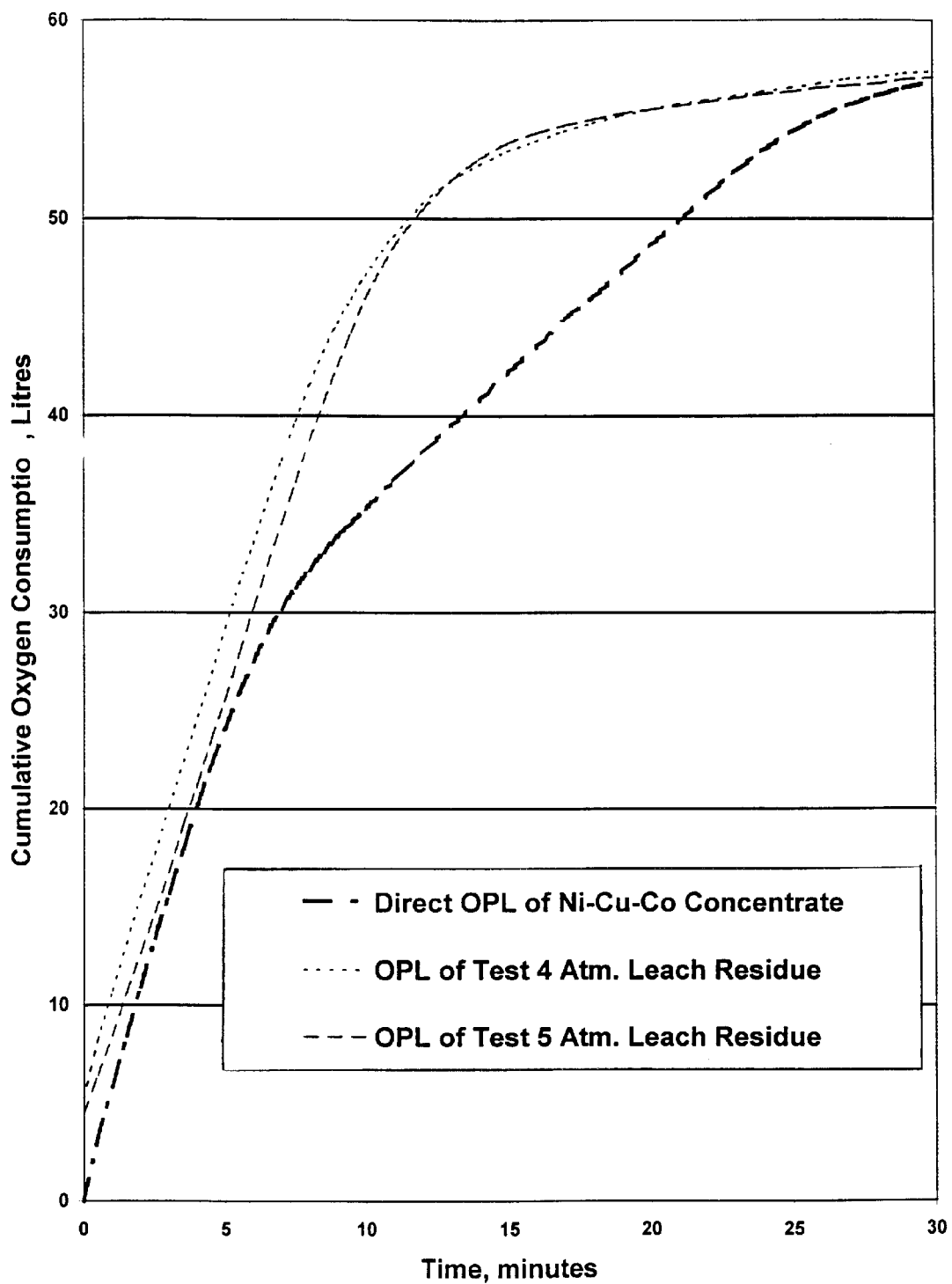
FIG. 3 is a graph showing comparative plots of the rate of oxygen consumption in batch oxidative pressure leach tests, carried out on atmospheric acid chlorine leach residues prepared according to the process of the present invention, and on nickel-copper-cobalt sulfidic flotation concentrate treated directly in the oxidative pressure leach according to the prior art.

FIG. 3 represents a plot of the cumulative oxygen consumption rates for these three OPL tests. The rate of oxygen consumption during a batch oxidative pressure leach, as measured by a gas mass flow meter, provides a convenient and reliable measure of the rate of oxidation of the sulfide minerals, which gives a good indication of the rate of extraction of the base metals. The plot in FIG. 3 shows that the consumption of oxygen by the sulfide oxidation reactions was essentially complete after about 20 minutes in the OPL tests on the atmospheric leach residues from tests 4 and 5. In contrast, a significant rate of oxygen consumption was observed up to 30 minutes in the direct OPL test on the Ni—Cu—Co sulfide-containing flotation concentrate. These data indicate that the retention time, required to achieve the target 98% nickel extraction in the oxidative pressure leach, is substantially reduced when the sulfide flotation concentrate is first treated in an atmospheric acid chlorine leach.

EXAMPLE II

This example is included to demonstrate the effect of feed particle size on the leaching of a Ni—Co—Cu sulfide flotation concentrate, containing 10% Ni, 2.6% Cu and 29% S, in a sulfate-chloride solution containing 5 g/L chloride and 35 g/L $H_2SO_4$. The concentrate ($d_{80}$~48 μm) was finely ground using an attritor mill to produce materials with $d_{80}$ values of about 13 μm, and 6 μm, respectively. Each sulfidic flotation concentrate sample was repulped in an atmospheric acid chlorine leach solution, to form a slurry containing 250 g/L solids, and subjected to oxidative pressure leaching at 150° C. The batch tests were carried out at an oxygen partial pressure of approximately 700 kPa, with retention times ranging between 20 and 60 minutes. A small quantity of water-soluble lignosulfonate salt was added to the oxidative pressure leach feed slurry to ensure good molten sulfur dispersion. The results are given in Table II below:

TABLE II

| Concentrate Particle Size, $d_{80}$, μm | 48 | 13 | 6 |
|---|---|---|---|
| Pressure Leach Time, min | 60 | 30 | 20 |
| Product Solution pH | 2.3 | 1.8 | 1.6 |
| Extraction, % | | | |
| Ni | 96 | 98 | 98 |
| Cu | 75 | 90 | 93 |

These tests show that ultra-fine grinding of the Ni—Cu—Co sulfide-containing flotation concentrate significantly reduces the leach time required to achieve the target 98% nickel extraction in an oxidative pressure leach. The finer grind also increases the extraction of copper from the more difficult to leach chalcopyrite mineral. However, the oxidative pressure leach residues become progressively more difficult to settle and filter as the particle size of the sulfidic flotation concentrate is reduced. In practice, the optimum particle size is believed to be in the range 15 to 30 μm.

EXAMPLE III

The following example illustrates the effect of chloride addition and leach temperature on the performance of the oxidative pressure leach. A series of batch pressure leach tests was conducted on very finely ground sulfide flotation concentrate ($d_{80}$~7 μm) to compare oxidative pressure leach performance at both 100 and 150° C. The Ni—Cu—Co sulfide flotation concentrate contained 15% Ni, 2.6% Cu and 34% S. A synthetic chloride-sulfate solution (5 g/L Cu, 5 g/L Cl and 10–40 g/L $H_2SO_4$) was used for the oxidative pressure leach tests in chloride-sulfate solution. The oxidative pressure leach tests in chloride-free sulfate solution were performed using a solution containing 5 g/L Cu and 40 g/L $H_2SO_4$. Water-soluble lignosulfonate salt was added to the leach slurry for oxidative pressure leach tests conducted at 150° C. The results are presented in Table III below.

TABLE III

| Leach Time, min | 180 | | 30 | | |
|---|---|---|---|---|---|
| Leach Temperature, ° C. | 100 | | 150 | | |
| Chloride Addition, g/L Product Solution | 0 | 5 | 0 | 5 | 11 |
| pH | 1.7 | 3.2 | 1.2 | 1.9 | 2.6 |
| Fe, g/L | 9 | <1 | 1 | <1 | <1 |
| Metal Extraction, % | | | | | |
| Ni | 99 | 96 | 99 | 98 | 98 |
| Cu | 78 | 75 | 70 | 85 | 60 |

EXAMPLE IV

This example illustrates the behavior of a low-chloride high-sulfate nickel solution in a nickel electrowinning process, carried out at a current density of 300 A/m² with a cell voltage of 3.0 volts. The electrowinning cell was a diaphragm cell containing a stainless steel cathode and two anodes consisting of a titanium substrate coated with a combination of tantalum, ruthenium and iridium oxides. The feed solutions contained 75 g/L Ni at pH 2.5 and 60° C., with concentrations of chloride ranging from 2.5 to 10 g/L. The compositions of the product anolyte solutions are presented in Table IV.

TABLE IV

| Chloride Concentration, g/L | Product Anolyte Solution Composition, g/L | | |
|---|---|---|---|
| | Ni | Cl | $H_2SO_4$ |
| 2.5 | 45 | 0.2 | 47 |
| 5.0 | 47 | 0.5 | 40 |
| 10.0 | 48 | 1.2 | 33 |

In each test, approximately 90% of the chloride ion was removed from the solution as chlorine gas, while about 35% of the nickel in the feed solution was plated out as metal at the cathode. The amount of sulfuric acid in the product solution decreased proportionately as the amount of chloride in the feed solution was increased.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for pressure leaching a feed slurry including nickel-cobalt-copper-containing sulfidic flotation concentrate comprising finely grinding the flotation concentrate to a particulate size ranging between 6 to 30 microns, preparing a second slurry containing the finely ground flotation concentrate, contacting the second slurry with an oxygen and chloride containing gaseous stream in an atmospheric acid leach to thereby generate a pressure leach feed slurry containing 2 to 40 g/L concentration of chloride ions therein, and subjecting the pressure leach feed slurry to an oxidative pressure leach under acidic conditions at a temperature of 150° C. to selectively leach the majority of the nickel, cobalt and copper therefrom to form a nickel, cobalt, copper containing leach solution and an oxidative pressure leach residue.

* * * * *

UNITED STATES PATENT AND TRADEMARK OFFICE
CERTIFICATE OF CORRECTION

PATENT NO.    : 6,569,224 B2
DATED         : May 27, 2003
INVENTOR(S)   : Kerfoot et al.

It is certified that error appears in the above-identified patent and that said Letters Patent is hereby corrected as shown below:

<u>Column 14,</u>
Line 33, should read -- chlorine -- (not "chloride").

Signed and Sealed this

Second Day of September, 2003

JAMES E. ROGAN
*Director of the United States Patent and Trademark Office*